United States Patent Office 3,567,826
Patented Mar. 2, 1971

3,567,826
THERAPEUTIC COMPOSITION CONTAINING 2-AMINO-OXAZOLIN-4-ONE DERIVATIVES
Jan Marcel Didier Aron-Samuel, 118 Rue Carnot, 92 Suresnes, Hauts-de-Seine, France
No Drawing. Filed May 2, 1966, Ser. No. 546,542
Claims priority, application Great Britain, May 10, 1965, 19,674/65
Int. Cl. A61u 27/00
U.S. Cl. 424—250
7 Claims

ABSTRACT OF THE DISCLOSURE

A therapeutic composition for the treatment of patients requiring an anti-inflammatory, anti-pyretic or analgesic agent comprises a pharmaceutically acceptable carrier and from about 5 mg. to about 1 g. of a derivative of 2-amino-oxazolin-4-one in which the substituent in the 5-position may be alkyl of 1–14 carbon atoms, phenyl, halophenyl, lower alkoxyphenyl or methylene-dioxyphenyl, the amino nitrogen being a part of a piperidine, pyrrolidine, morpholine or piperazine ring, which ring may also contain a C-lower alkyl or C-di-lower alkyl substituent, and when the ring is piperazine, there may be substituted on the second nitrogen atom thereof an alkyl, hydroxyalkyl, N-dialkylaminoalkyl, phenyl, halophenyl, alkylphenyl, alkoxyphenyl, benzyl, alkanoyl, benzoyl, halobenzoylalkyl, or trialkoxybenzoyl group.

---

The present invention concerns a therapeutic composition exhibiting, in particular, anti-inflammatory, anti-pyretic and analgesic properties.

This composition is characterized in that it contains, as active principle, in association with a pharmaceutically acceptable vehicle, a 2-amino-oxazolin-4-one derivative of general formula:

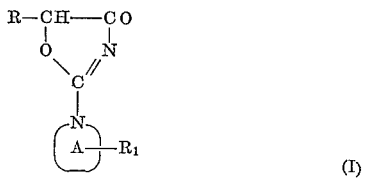

(I)

wherein R is an alkyl group or a substituted or unsubstituted phenyl group, A is a piperidino, pyrrolidino, morpholino or piperazino ring, each of said rings possibly comprising one or two lower alkyl substituents on nuclear carbons, and $R_1$, when A is a piperazino ring, is a substituent of the second nitrogen atom of said ring, consisting of hydrogen, an alkyl, acyl, aryl, alkaryl or aralkyl group, said groups being substituted or unsubstituted, or an acid addition salt of such a derivative with a pharmaceutically acceptable acid.

The preferred meanings of R and $R_1$ are the following:

R = alkyl group having 1–14 carbon atoms, phenyl and phenyl mono- or di-substituted with halogens, alkoxy groups or a methylene-dioxy group;

$R_1$ = hydrogen, alkyl, hydroxyalkyl, N-dialkyl substituted alkylamino, phenyl, halophenyl, alkylphenyl, alkoxy phenyl, benzyl, alkanoyl, benzoyl and trialkoxybenzoyl, the alkyl, alkoxy and alkanoyl groups in this list being lower groups having 1–6 carbon atoms.

Derivatives (I) are, as a whole, novel derivatives, also contemplated as such according to the invention, to the exclusion of three of them wherein R is the phenyl group and A is the piperidino, piperazino (with $R_1$=methyl) and morpholino ring, respectively.

The latter three compounds are described by Charles F. Howell et al. in an article published in "Journal of Organic Chemistry (1962, vol. 27, pages 1679–1685)," although they are not disclosed as therapeutically active.

Indeed, the anti-inflammatory, anti-pyretic and analgesic properties of derivatives (I) as a whole and, consequently, of the latter three compounds—discovered according to the invention—were found to be most important and insure to these derivatives wide applicability in medicine, particularly for the treatment of rheumatism. Said properties are all the more unexpected since other previously described derivatives of 2-amino oxazolin-4-one not comprised within the scope of general Formula I and some of which are also mentioned in the paper by Charles F. Howell et al. mentioned above were all suggested as psychotonic compounds.

In contrast, derivatives (I) are devoid of any psychic effect, their properties, as mentioned above, being effective in an entirely different field.

As will be seen hereinafter in more detail, these properties are accompanied by low toxicity, the new derivatives possessing a broad therapeutic safety range and avoiding to a large extent the drawbacks of allergy or gastric irritation which restrict the utilization of the products at present in use (such as corticoids or phenylbutazone).

To prepare the new derivatives (I), a compound of general formula

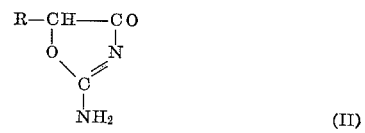

(II)

namely, a 2-amino, oxazolin-4-one substituted at the 5-position with radical R, is reacted with a heterocyclic base of general formula

R, A and $R_1$ having the above defined meanings, the possible substituent $R_1$ being, if desired, hydrogen and replaced, after the reaction, by another desired radical included within the meaning of $R_1$.

The reaction between the 2-amino oxazolin-4-one and the heterocyclic base may be effected in various ways.

According to one embodiment, one mole of the former reagent is heated with an excess (5–10 moles) of the latter reagent, the heating time being variable (generally between ¼ hour and 3 hours).

The desired product crystallizes upon cooling and the possible addition of a non-polar solvent. It may then be recrystallized from a suitable solvent.

The same procedure can be used without heating, however with a longer reaction time (6–24 hours). As a modification, the reaction can be carried out by heating in the presence of a solvent such as isoamyl alcohol or xylene. According to this latter modification, using an excess of solvent, the amount of heterocyclic base used may be reduced and it is possible to operate with substantially equimolar amounts of 2-amino oxazolin-4-one and heterocyclic base.

When $R_1$, in the resultant compound, is hydrogen, and when it is desired to replace this hydrogen with another $R_1$ substituent, this compound may be heated in a solvent such as benzene with an halide of this substituent, in the presence of an acid binding agent such as triethylamine.

The substituted 2-amino oxazolin-4-ones (II) are novel compounds when radical R is an alkyl group having 4 or more carbon atoms.

For the preparation thereof, an α-hydroxyester of formula

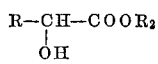

wherein R has the above meaning and $R_2$ is a lower alkyl group, is reacted with guanidine. The reaction is advantageously effected by heating the reagents within a solvent such as alcohol, according to the example given below.

Preparation of compounds (II): 2-amino-5-butyl oxazolin-4-one

To 160 g. of ethyl α-hydroxycaproate are added 59 g. of guanidine in alcohol solution. The mixture is refluxed for 1½ hours. On cooling, 2-amino-5-butyl oxazolin-4-one is obtained (33% yield).

The product obtained has a Kofler melting point of 217–219° C.

Analysis.—N%=18.11 (theory 18.14).

Using the same conditions, and substituting ethyl α-hydroxycaproate with ethyl α-hydroxyisocaproate, ethyl α-hydroxycaprylate, ethyl α-hydroxyundecanoate and ethyl α-hydroxypalmitate, the following compounds (II) are obtained, respectively, the Kofler determined melting point of which is indicated in parentheses:

2-amino 5-isobutyl oxazolin-4-one (203° C.),
2-amino 5-hexyl oxazolin-4-one (214° C.),
2-amino 5-nonyl oxazolin-4-one (198–200° C.),
2-amino 5-tetradecyl oxazolin-4-one (180–182° C.).

The following examples illustrate the preparation of some of the derivatives (I):

EXAMPLE 1

2-pyrrolidinyl 5-phenyl oxazolin-4-one or LA 1126

To 35.2 g. (0.2 mol) of 5-phenyl 2-amino oxazolin-4-one are added 81 g. of pyrrolidine (1.24 mol). The mixture is refluxed gently during 1½ hours. A solid crystallizes upon cooling.

After recrystallizations, 24 g. of LA 1126, M.P. 150–152° C. (yield 52%) are obtained.

EXAMPLE 2

2-piperidinyl 5-phenyl oxazolin-4-one or LA 1123

To 10 g. of 5-phenyl 2-amino oxazolin-4-one are added 24 g. of piperidine. The mixture is stirred in the cold during 24 hours. The white slurry is filtered by suction.

There are obtained 13 g. of LA 1123, M.P. 125° C. (yield above 90%).

EXAMPLE 3

2-piperazinyl 5-phenyl oxazolin-4-one or LA 1148

To 8.8 g. (0.05 mol) of 5-phenyl 2-amino oxazolin-4-one are added 21.5 g. (0.25 mol) of anhydrous piperazine and 100 ml. of xylene.

The mixture is refluxed for 1½ hours.

After cooling, the reaction mixture is suction filtered and the insoluble is recrystallized from 100 ml. of benzene.

There are obtained 7 g. of LA 1148, M.P. 146–148° C., with a yield of 51%.

EXAMPLE 4

2-N-methylpiperazinyl 5-phenyl oxazolin-4-one or LA 1124

To 17.6 g. of 5-phenyl 2-amino oxazolin-4-one (0.1 mol) are added 11 g. (0.1 mol) of N-methylpiperazine and 100 ml. of anhydrous xylene. The mixture is heated by means of an electric heating flask. $NH_3$ is evolved at about 110–120° C.

After refluxing for 2 hours (138° C.) the reaction is complete and dissolution is complete. Heating is continued for another ½ hour and is then filtered hot. Crystallization occurs on cooling. The mixture is washed with xylene, followed by cyclohexane. There are obtained 24 g. of creamy white product M.P.=148–150° C. (yield: 93%).

EXAMPLE 5

2-[4'-(3".4".5"-trimethoxy benzoyl)]-piperazinyl 5-phenyl-oxazolin-4-one or LA 1149

To 12.3 g. of 2-piperazino 5-phenyl oxazolin-4-one (0.05 mol) are added 5 g. of anhydrous triethylamine on KOH (0.05 mol) and 100 ml. of benzene. The mixture is stirred, and in the resultant suspension is poured, over 5 minutes, a solution of 11.5 g. of 3.4.5.-trimethoxy benzoic acid chloride (0.05 mol) in 75 ml. of benzene. The mixture is refluxed for 1 hour.

The resultant product is recrystallized from 150 ml. of dimethyl formamide.

There are obtained 18.1 g. of LA 1149 (yield, 83%); M.P.=250–252° C.

EXAMPLE 6

5-butyl-2-piperidino-oxazolin-4-one or LA 1190

To 6 g. of 2-amino-5-butyl-oxazolin-4-one are added 38 ml. of piperidine and the mixture is refluxed for twenty minutes. The mixture is brought to dryness under a pressure of 20 mm. The resultant oil is taken up with 25 ml. of ether and a mixture of hydrochloric acid and ether is added to this mixture to pH 1. There are thus obtained 8.5 g. of 5-butyl 2-piperidino oxazolin-4-one hydrochloride (yield, 85%).

The product obtained has a Kofler melting point of 134–136 C.

Analysis.—N%=10.72 (theory 10.74). Cl%=13.48 (theory 13.60).

EXAMPLE 7

5-hexyl 2-piperidino oxazolin-4-one or LA 1195

Using the same conditions as in Example 6, from 2-amino 5-hexyl oxazolin-4-one, there is obtained a clear oil at laboratory temperature which, however, crystallizes on cooling to 0° C. The hydrochloride is obtained by addition of hydrochloric acid in isopropanol to the ether solution of this base (yield, 83%).

The Kofler melting point of 5-hexyl 2-piperidino oxazolin-4-one hydrochloride is 124–126° C.

Analysis.—Cl%=12.27% (theory 12.28).

EXAMPLE 8

5-hexyl 2-N-butylpiperazino oxazolin-4-one or LA 1167

To 7.1 g. of N-butylpiperazine and 50 ml. of xylene there are added 9.4 g. of 2-amino 5-hexyl oxazolin-4-one. The mixture is refluxed for 1 hour and is evaporated in vacuo. The oily residue is taken up with 50 ml. of acetonitrile. The insoluble is filtered. The resultant oils is brought to dryness and is taken up with 50 ml. petroleum ether. 5-hexyl 2-N-butylpiperazino oxazolin-4-one crystallizes as needles (yield: 49%).

Analysis.—N%=13.45 (theory 13.58).

The Kofler melting point of the product obtained is 48–50 C.

EXAMPLE 9

5-hexyl 2-N-methylpiperazino oxazolin-4-one or LA 1197

Using the same conditions as in Example 8, from 2-amino 5-hexyl oxazolin-4-one and N-methylpiperazine there is obtained 5-hexyl 2-N-methylpiperazino oxazolin-4-one (yield 53) having a melting point of 40° C. (Tottoli).

Analysis.—N%=15.78 (theory 15.72).

This base, treated with the equivalent of hydrochloric acid in isopropanol gives 5-hexyl 2-N-methylpiperazino oxazolin-4-one hydrochloride having a melting point of 208° C. (Tottoli).

*Anaylsis.*—Cl%=11.63 (theory 11.67). N%=13.95 (theory 13.83).

EXAMPLE 10

5-butyl 2-morpholino oxazolin-4-one or LA 1184

To 9.6 g. of morpholine and 150 ml. of xylene there are added 15.6 g. of 2-amino 5-butyl oxazolin-4-one. The mixture is refluxed for 2 hours. The solid obtained on cooling is filtered and recrystallized from acetonitrile. There is obtained 5-butyl 2-morpholino oxazolin-4-one (yield 40%).

The product obtained has a Kofler melting point of 90° C.

*Analysis.*—N%=12.46 (theory 12.47).

EXAMPLE 11

5-butyl 2-N-(hydroxyethyl)-piperazino oxazolin-4-one or LA 1183

To 14.3 g. of N-(hydroxyethyl)-piperazine and 150 ml. of xylene there are added 15.6 g. of 2-amino-5-butyl oxazolin-4-one. The mixture is refluxed for 1½ hours and is evaporated under 20 mm. The oily residue is taken up with acetonitrile (200 ml.) and the insoluble is filtered. On evaporation, there is obtained an oil which crystallizes. The solid recrystallized from methyl ethyl ketone is 5-butyl-2-N-(hydroxyethyl)-piperazino oxazolin-4-one (yield, 41%).

The product obtained has a Kofler melting point of 71° C.

*Analysis.*—N%=15.57 (theory 15.58).

EXAMPLE 12

5-butyl 2-N-(paratolyl)-piperazino oxazolin-4-one or LA 1182

Using the same conditions as in Example 11, from 2-amino 5-butyl oxazolin-4-one and N-(paratolyl)-piperazine there is obtained 5-butyl 2-N-(paratolyl)-piperazino oxazolin-4-one.

The product obtained has a Kofler melting point of 139° C.

*Analysis.*—N%=13.24 (theory 13.32).

In the table below are listed derivatives (I) prepared according to the above examples and other derivatives (I) prepared according to similar procedures.

| Code No. | R | A—R$_1$ | Melting point, °C. |
|---|---|---|---|
| LA 1108 | Isobutyl | Piperidino | 66–66 |
| LA 1109 | Hexyl | 4-methyl piperidino, HCl | 138–140 |
| LA 1110 | Butyl | Pyrrolidino, HCl | 153 |
| LA 1112 | Hexyl | Pyrrolidino | 101 |
| LA 1114 | do | N(p.tolyl)piperazino | 132 |
| LA 1116 | do | N(hydroxyethyl)-piperazino | 86 |
| LA 1117 | Isobutyl | N-methylpiperazino, HCl | 258–260 |
| LA 1123 | Phenyl | Piperidino | 125 |
| LA 1124 | do | N-methylpiperazino | 148–150 |
| LA 1125 | do | N-phenylpiperazino | 190–192 |
| LA 1126 | do | Pyrrolidino | 152 |
| LA 1127 | do | N-paratolylpiperazino | 180 |
| LA 1128 | do | Morpholino | 164–166 |
| LA 1132 | Methyl | N-methylpiperazino, HCl | 243 |
| LA 1134 | p-Fluorophenyl | N-methylpiperazino | 156 |
| LA 1135 | Phenyl | N-benzylpiperazino | 162–164 |
| LA 1136 | p-bromophenyl | N-methylpiperazino | 182–184 |
| LA 1137 | Phenyl | N-(hydroxyethyl) piperazino | 90–92 |
| LA 1138 | do | N-(paramethoxyphenyl)piperazino | 182–184 |
| LA 1139 | do | N-(parachlorophenyl)piperazino | 156–158 |
| LA 1140 | p-Methoxyphenyl | Piperidino | 108–110 |
| LA 1143 | o-Chlorophenyl | do | 98–100 |
| LA 1144 | 3,4-methylene dioxyphenyl | Pyrrolidino | 152–154 |
| LA 1145 | Phenyl | 4-methyl piperidino | 104–106 |
| LA 1146 | do | 3-methyl piperidino | 136–138 |
| LA 1147 | Methyl | Piperidino | 48–50 |
| LA 1148 | Phenyl | Piperazino | 146–148 |
| LA 1149 | do | [4'(3"-4"-5"-benzoyl)] piperazino | 250–252 |
| LA 1150 | p-Chlorophenyl | Piperidino | 118–120 |
| LA 1151 | p-Bromophenyl | do | 138–140 |
| LA 1152 | Phenyl | N-acetylpiperazino | 142–144 |
| LA 1153 | p-Bromophenyl | Morpholino | 180–182 |
| LA 1154 | p-Chlorophenyl | N-p. tolylpiperazino | 202–204 |
| LA 1155 | Phenyl | N-diethylaminoethylpiperazino | 84–86 |
| LA 1156 | do | 3-methyl N-acetylpiperazino | 162–164 |
| LA 1157 | do | 3.5-dimethyl N-acetyl piperazino | 180–190 |
| LA 1158 | do | N-propylpiperazino | 134–136 |
| LA 1165 | do | N-butylpiperazino | 112–114 |
| LA 1166 | Propyl | Piperidino, HCl | 124–126 |
| LA 1167 | Hexyl | N-butylpiperazino | 48–50 |
| LA 1168 | do | N-propylpiperazino | 44–45 |
| LA 1169 | do | Piperazino | 78 |
| LA 1173 | do | N-diethylaminoethylpiperazino | [1] 35–36 |
| LA 1180 | Phenyl | N-(4'-chlorobutyrophenone piperazino | 152–154 |
| LA 1181 | do | N-4'-fluorobutyrophenone-4-yl) piperazino | 134–136 |
| LA 1182 | Butyl | N-(p. tolyl)piperazino | 139 |
| LA 1183 | do | N-(hydroxyethyl)-piperazino | 71 |
| LA 1184 | do | Morpholino | 90 |
| LA 1185 | Tetradecyl | Piperidino | 64–66 |
| LA 1186 | do | N-methylpiperazino | 74–76 |
| LA 1187 | Nonyl | Piperidino | 45 |
| LA 1188 | do | N-methylpiperazino | 54–56 |
| LA 1190 | Butyl | Piperidino, HCl | 134–136 |
| LA 1193 | p. Fluorophenyl | Piperidino | 98–100 |
| LA 1195 | Hexyl | Piperidino, HCl | 124–126 |
| LA 1196 | Butyl | N-methylpiperazino, HCl | [1] 216–217 |
| | | N-methylpiperazino, base | [1] 56–57 |
| LA 1197 | Hexyl | N-methylpiperazino, HCL | [1] 208 |
| | | N-methylpiperazino, base | [1] 40 |
| LA 1198 | Butyl | N-propylpiperazino | 64–66 |
| LA 1199 | do | N-phenylpiperazino | 118 |

[1] Tottoli.

Derivatives (I) were submitted to a pharmacological study for the purpose of evaluating their toxicity and properties. The results of these tests are summarized below:

(1) TOXICITY (a) Acute toxicity: The LD 50 of all derivatives (I)

is high, as may be seen from the following values obtained orally in mice:

Product: LD 50
- LA 1108 ____ About 1000 mk./kg.
- LA 1109 ____ About 1400 mg./kg.
- LA 1110 ____ About 1250 mg./kg.
- LA 1112 ____ >800 mg./kg.
- LA 1114 ____ >1500 mg./kg.
- LA 1116 ____ About 1500 mg./kg.
- LA 1117 ____ >2000 mg./kg.
- LA 1123 ____ 600 mg./kg.
- LA 1124 ____ >350 mg./kg., and 380 mg./kg. orally in rat.
- LA 1125 ____ >4 g./kg.
- LA 1126 ____ 500 mg./kg.
- LA 1127 ____ >4 g./kg.
- LA 1128 ____ 3.5 g./kg.
- LA 1130 ____ 450 mg./kg.
- LA 1131 ____ 4 g./kg.
- LA 1134 ____ 650 mg./kg.
- LA 1135 ____ >4 g./kg.
- LA 1137 ____ 850 mg./kg.
- LA 1138 ____ >3 g./kg.
- LA 1139 ____ >4 g./kg.
- LA 1145 ____ 1 g./kg.
- LA 1146 ____ 1.2 g./kg.
- LA 1147 ____ 2.25 g./kg.
- LA 1148 ____ 115 mg./kg.
- LA 1149 ____ >4 g./kg.
- LA 1150 ____ 3500 mg./kg.
- LA 1151 ____ >4 g./kg.
- LA 1181 ____ >800 mg./kg.
- LA 1182 ____ >1500 mg./kg.
- LA 1183 ____ >800 mg./kg.
- LA 1184 ____ >1500 mg./kg.
- LA 1185 ____ >800 mg./kg.
- LA 1186 ____ >800 mg./kg.
- LA 1187 ____ >800 mg./kg.
- LA 1188 ____ >800 mg./kg.
- LA 1190 ____ 520 mg./kg.
- LA 1193 ____ 600 mg./kg.
- LA 1195 ____ 1400 mg./kg.
- LA 1196 ____ 650 mg./kg.
- LA 1197 ____ 1250 mg./kg.
- LA 1198 ____ >400 mg./kg.
- LA 1199 ____ >800 mg./kg.

Determined by intravenous perfusion at 1% in guinea-pig, the toxicity is also very low. As an example, the lethal dose was found to be 240 mg./kg. with LA 1197 on uninterrupted perfusion and of 420 mg./kg. when interrupting and subsequently resuming perfusion.

(b) Chronic toxicity: This was studied in rat and dog during four months with compounds LA 1123, 1124, 1195, 1196 and 1197, at a daily dosage of 10–300 mg./kg. and no significant anomaly was noted in the blood picture, in renal and hepatic tests and in the tests of the various organs affected during the pathological examination, and neither was there noted any unfavorable influence on the growth of the animals.

(2) ANTI-INFLAMMATORY EFFECT

This was studied in a systematic manner by injecting in the paw of the rat 0.2 ml. of a 25% polyvinyl pyrrolidone solution or of some other irritant material such as a formaldehyde solution, a 10% Teepol solution or a carrageenin solution. This created an edema of the paw. The diameter of the latter is measured with a micrometer caliper and by plethsmorgraphy before and after injection, at ½ hour intervals over a period of 3 hours:

(a) on reference rats,
(b) on rats subjected to the drug to be tested,
(c) on rats subjected to a known powerful anti-inflammatory agent used for comparison purposes, namely phenylbutazone.

Other experiments were carried out by including under the skin of the rat a piece of cotton wool which created a local inflammatory granuloma. After 5 days, the granuloma is removed and weighed comparatively in respect of the reference animals, the animals which had absorbed the product to be tested and the rats submitted to cortisone treatment.

The result of these tests is summarized in the following table in which the efficiency of each product is expressed as a percentage of the reduction of the edema relative to the reference animals:

| Product | Dose, mg./kg. | Percent of reduction |
|---|---|---|
| LA 1123 | 50 | 79 |
| LA 1124 | 12 | 35 |
| LA 1124 | 5 | 25 |
| LA 1124 | 0.1 | 20 |
| LA 1125 | 50 | 37 |
| LA 1126 | 0.1 | 30 |
| LA 1127 | 0.1 | 13 |
| LA 1128 | 5 | 30 |
| LA 1134 | 50 | 67 |
| LA 1136 | 100 | 45 |
| LA 1139 | 5 | 34 |
| LA 1137 | 50 | 37 |
| LA 1158 | 6 | 35 |
| LA 1165 | 2.5 | 40 |
| LA 1155 | 5 | 20 |
| LA 1169 | 100 | 25 |
| LA 1148 | 5 | 47 |
| LA 1146 | 5 | 20 |
| LA 1182 | 5 | 22 |
| LA 1181 | 5 | 59 |
| LA 1183 | 5 | 25 |
| LA 1195 | 3 | 60 |
| LA 1196 | 0.1 | 50 |
| LA 1197 | 0.1 | 35 |

It is clear that this is a general property common to all members of the family. To give an idea of its intensity, it will be mentioned that 50 mg. of LA 1123, for example, are twice as effective as 200 of phenylbutazone, that is, an action eight times stronger than that of one of the most powerful known anti-inflammatory agents, with a much wider tolerance margin.

Derivatives (I) such as LA 1190, 1198, 1197, 1196 and 1182 have shown anti-inflammatory properties at doses of less than 1 mg./kg. and are thus active at doses that are much lower than the activity doses of products widely used clinically such as dehydrocortisone, Δ-cortisone and phenylbutazone.

(3) ANALGESIC EFFECT

This was studied by measuring the time that mice placed on a plate maintained at 56° C. took to start to lock their paws. The product is examined comparatively with a reference analgesic, generally codeine hydrochloride as a subcutaneous 10 mg./kg. injection. The test product is administered orally at the dose of 50 mg./kg.

The results given in the following table are expressed as a percentage of the slowing down of the paw licking time:

- LA 1123 _____ 70
- LA 1124 _____ 70
- LA 1125 _____ 60
- LA 1126 _____ 58
- LA 1127 _____ 60
- LA 1128 _____ 60
- LA 1131 _____ 58
- LA 1134 _____ 80
- LA 1135 _____ 40
- LA 1137 _____ 80
- LA 1138 _____ 30
- LA 1139 _____ 12
- LA 1140 _____ 62
- LA 1144 _____ 12
- LA 1145 _____ 14
- LA 1146 _____ 14
- LA 1148 _____ 70
- LA 1149 _____ 15
- LA 1150 _____ 15

To give an idea of the intensity of this effect, it will be noted that 12 mg. of LA 1124 administered orally are as effective as 10 mg. of morphine hydrochloride administered by the subcutaneous route.

(4) ANTI-PYRETIC ACTION

This action was investigated in rabbit, by antagonism with respect to fever caused by injection of T.A.B. vaccine.

In particular, ingestion of 100 mg. of LA 1195 or LA 1197 causes a rapid decrease of the temperature of the animal to which T.A.B. vaccine has been injected previously, whereas this temperature remains high in the controls. In contrast, no temperature lowering effect is noted in the normal animal.

(5) STIMULATING EFFECT

None of compounds (I) causes a stimulating effect on the central nervous system of mice when tested according to conventional methods.

In human clinics, derivatives (I) together with their pharmaceutically acceptable salts, due to their excellent anti-inflammatory, analgesic and anti-pyretic properties, are useful especially in the treatment of rheumatism and also in the treatment of neuralgia, headaches and, generally, of all conditions wherein there exists an inflammatory or painful syndrome.

In such indications, derivatives (I) and the salts thereof are formulated as therapeutic compositions with the usual pharmaceutical vehicles for oral, rectal or parenteral administration.

Thus, for oral administration, derivatives (I) and the salts thereof may be formulated, for example, in the form of tablets, granules, capsules, potable syrups and solutions, the vehicle, in the two last-named cases, consisting of a flavoured liquid. It may sometimes be useful to provide the tablets with an enteric coating to prevent any risk of destruction of the active principle in the stomach.

For rectal administration, derivatives (I) and the salts thereof may be formulated in the form of suppositories with conventional pasty vehicles such as cocoa butter and the synthetically produced substitutes thereof, while, for parenteral administration, they may be formulated in ampoules as injectable solutions or suspensions in sterile liquids, especially in isotonic aqueous solutes.

In the therapeutic compositions in unit dosage form such as tablets, suppositories and injectable ampoules, derivative (1) or the salt thereof, constituting the active principle, may be present in an amount of about 5 mg. to 1 g. although, generally, a preferred concentration range is comprised between about 25 and about 500 mg. in the case of tablets and suppositories.

A daily dosage regimen that was found useful is of 50 mg. to 3 g. of active principle by the oral or rectal route, and of 5 mg. to 1 g. by the parenteral route.

Having now described my invention what I claim as new and wish to secure by Letters Patent is:

1. Therapeutic composition in unit dosage form adapted for administration to obtain an anti-inflammatory, anti-pyretic or analgesic effect, comprising a pharmaceutically acceptable vehicle and from about 5 mg. to about 1 g. of an active principle selected from the group consisting of a derivative of a 2-amino-oxazolin-4-one of the formula

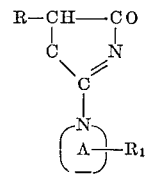

and a pharmaceutically acceptable acid addition salt of said derivative, wherein R is selected from the group consisting of alkyl containing 1–14 carbon atoms, phenyl, halophenyl, lower alkoxyphenyl and methylene-dioxyphenyl; A is selected from the group consisting of piperazino, C-lower alkyl piperazino and C-di-lower alkyl piperazino; $R_1$ is substituted on the second nitrogen atom of the piperazino group and is selected from the group consisting of hydrogen, alkyl, hydroxyalkyl, N-dialkylaminoalkyl, phenyl, halophenyl, alkylphenyl, alkoxyphenyl, benzyl, alkanoyl, benzoyl, halobenzoylalkyl and trialkoxybenzoyl, said alkyl, alkoxy and alkanoyl having from 1–6 carbon atoms.

2. Composition as claimed in claim 1, formulated for oral and rectal administration, containing from about 25 to about 500 mg. of active principle.

3. Composition as claimed in claim 1, formulated for parenteral administration, containing from about 5 mg. to about 1 g. of active principle together with an injectable liquid vehicle.

4. Composition as claimed in claim 1, wherein said 2-amino oxazolin-4-one derivative is 5-hexyl-2-N-methyl-piperazino oxazolin-4-one.

5. Composition as claimed in claim 1, wherein said 2-amino oxazolin-4-one derivative is 5-phenyl-2-N-propyl-piperazino oxazolin-4-one.

6. Composition as claimed in claim 1, wherein said 2-amino oxazolin-4-one derivative is 5-phenyl-2-N-p-tolyl-piperazino oxazolin-4-one.

7. Composition as claimed in claim 1, wherein said 2-amino oxazolin-4-one derivative is 5-phenyl-2-N-diethyl-aminoethyl piperazino oxazolin-4-one.

References Cited

UNITED STATES PATENTS 3,321,470  5/1967  Howell et al. _____ 424—250

OTHER REFERENCES

Howell et al.: Journal of Org. Chem., vol. 27, pp. 1679–1685 (1962).

STANLEY J. FRIEDMAN, Primary Examiner

U.S. Cl. X.R.

424—248, 267, 272, 274; 260—268